US012612892B2

(12) United States Patent
Kang et al.

(10) Patent No.: US 12,612,892 B2
(45) Date of Patent: Apr. 28, 2026

(54) HYDROPOWER DEVICE COMBINING LIFT AND DRAG EFFECTS

(71) Applicant: JIANGSU UNIVERSITY, Jiangsu (CN)

(72) Inventors: Can Kang, Jiangsu (CN); Zhiyuan Wang, Jiangsu (CN); Yongchao Zhang, Jiangsu (CN); Jin Yin, Jiangsu (CN); Shuang Teng, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 83 days.

(21) Appl. No.: 18/692,834

(22) PCT Filed: May 9, 2023

(86) PCT No.: PCT/CN2023/092918
§ 371 (c)(1),
(2) Date: Mar. 18, 2024

(87) PCT Pub. No.: WO2024/229684
PCT Pub. Date: Nov. 14, 2024

(65) Prior Publication Data

US 2025/0243838 A1 Jul. 31, 2025

(30) Foreign Application Priority Data

May 8, 2023 (CN) ........................ 202310507970.X

(51) Int. Cl.
*F03B 17/06* (2006.01)

(52) U.S. Cl.
CPC ........ *F03B 17/063* (2013.01); *F05B 2240/30* (2013.01); *F05B 2250/311* (2013.01); *F05B 2250/71* (2013.01)

(58) Field of Classification Search
CPC ................ F03B 17/063; F05B 2240/30; F05B 2250/311; F05B 2250/71
(Continued)

(56) References Cited

U.S. PATENT DOCUMENTS 7,849,596 B2 * 12/2010 Sauer .................... B23P 15/006 29/889.7
8,109,732 B2 * 2/2012 Haddjeri ................... F03D 1/06 416/223 R
(Continued)

FOREIGN PATENT DOCUMENTS

CN 102094752 A * 6/2011
CN 103321859 9/2013
(Continued)

OTHER PUBLICATIONS

"International Search Report (Form PCT/ISA/210) of PCT/CN2023/092918", mailed on Dec. 19, 2023, pp. 1-3.
(Continued)

*Primary Examiner* — Charles Reid, Jr.
(74) *Attorney, Agent, or Firm* — JCIPRNET

(57) ABSTRACT

The disclosure relates to a hydropower device with its operation driven by a combination of lift and drag forces. The device comprises a shaft, a lift-type runner, a first-stage drag-type runner, and a second-stage drag-type runner, wherein the lift-type runner, the first-stage drag-type runner, and the second-stage drag-type runner are coaxially installed on the shaft. The shaft is rotatably installed on a supporting frame. The first-stage drag-type runner and the second-stage drag-type runner are mounted in series on the shaft. A disc generator is installed on the shaft and meanwhile in the middle of the first- and the second-stage drag-type runners. A lift-type runner is connected to the shaft through struts,
(Continued)

and the blades of the lift-type runner are oriented in the periphery of the first-type and the second-type runners.

3 Claims, 3 Drawing Sheets

(58) Field of Classification Search
USPC .......................................... 290/42, 43, 53, 54
See application file for complete search history.

(56) References Cited

U.S. PATENT DOCUMENTS

| | | | | |
|---|---|---|---|---|
| 2009/0261595 | A1* | 10/2009 | Poo | F03D 3/02 290/55 |
| 2010/0233919 | A1* | 9/2010 | Ersoy | B63H 9/02 290/55 |
| 2011/0133474 | A1* | 6/2011 | Haar | F03D 7/0232 290/55 |
| 2021/0163109 | A1* | 6/2021 | Chou | F03D 1/0601 |

FOREIGN PATENT DOCUMENTS

| | | | | | |
|---|---|---|---|---|---|
| CN | 109026496 | | | 12/2018 | |
| CN | 109072864 | | | 12/2018 | |
| CN | 111396231 | | | 7/2020 | |
| CN | 112901413 | | | 6/2021 | |
| GB | 2386161 | A | * | 9/2003 | F04D 29/266 |
| JP | 2004116289 | | | 4/2004 | |
| KR | 20110138066 | | | 12/2011 | |
| KR | 20110138066 | A | * | 12/2011 | |

OTHER PUBLICATIONS

"Written Opinion of the International Searching Authority (Form PCT/ISA/237) of PCT/CN2023/092918", mailed on Dec. 19, 2023, pp. 1-3.

* cited by examiner

HYDROPOWER DEVICE COMBINING LIFT AND DRAG EFFECTS

CROSS-REFERENCE TO RELATED APPLICATION

This application is a 371 of international application of PCT application serial no. PCT/CN2023/092918, filed on May 9, 2023, which claims the priority benefit of China application no. 202310507970.X, filed on May 8, 2023. The entirety of each of the above mentioned patent applications is hereby incorporated by reference herein and made a part of this specification.

TECHNICAL FIELD

The present invention relates to a hydropower device harnessing the kinetic energy of flowing water for generating electricity through the action of the flowing water on runner blades, and in particular relates to a hydropower device combining lift and drag effects, which belongs to the technical field of hydroelectric power generation equipment.

RELATED ART

The hydroelectric power generation device utilizes the kinetic energy in tides, waves and rivers to generate electricity. Under the hydraulic impact of flowing water, the runner blades convert the kinetic energy of water into the mechanical energy that propels the shaft of the runner to rotate, and the shaft of the runner drives the rotor of the generator to rotate, and the rotor is electromagnetically coupled with the stator, and electricity is thereby generated. Commonly used runners suffer from the effect of large tilting moment, so the risk of bending is explicit, and the operating stability of the whole power generation unit is affected. Moreover, the shafts of commonly used runners are vertically installed, so the wake flow immediately downstream of the runner may impose a scouring effect on the downstream seabed or riverbed, thus damaging the underwater environment.

In addition, in terms of operating efficiency, the operation of a single drag-type runner generates a high torque, but corresponding energy conversion efficiency is low. In comparison, lift-type runners have high energy conversion efficiency, but the self-startup performance is low. The cost of fabrication of a large unit of hydroelectric power generation is high, and the installation is not convenient. In offshore or shallow-water regions, large units are not suitable.

Therefore, there is an urgent need to develop a hydroelectric power generation device with a comprehensive consideration of the operating efficiency, startup performance, operating stability, fabrication cost and clustering application.

SUMMARY OF INVENTION

The purpose of the present invention is to overcome the deficiencies of current technology, provide a hydropower device combining lift and drag effects, and meanwhile take into account the energy conversion efficiency, startup performance, operating stability and impact on environment.

The object of the present invention is achieved through the following technical solutions:

The hydropower device combining lift and drag effects is characterized in that: comprises a shaft, a lift runner, a first-stage drag-type runner and a second-stage drag-type runner; and the two drag-type runners are configured in series; the three runners are coaxially installed on the shaft; the shaft is rotatably installed on the support frame; the disc generator is positioned between the first-stage drag-type runner and the second-stage drag-type runner and is coaxially installed on the shaft with the three runners; the lift blades are connected to the shaft through struts and encircle the first-stage drag-type runner, the disc generator and the second-stage drag-type runner; with such a combinative structure, both the lift-type runner and the drag-type runners generate the torque driving the rotation of the shaft under the impact of incoming water, the rotor of the generator can rotate synchronously with the three runners since it is connected with the shaft; with such a device, the kinetic energy of flowing water is converted into the mechanical energy and then electricity.

Further, for the abovementioned hydropower device combining lift and drag effects, wherein the lift-type runner is equipped with three twisted lift blades mounted on the shaft through struts.

Further, for the abovementioned hydropower device combining lift and drag effects, wherein two struts are arranged at the two ends of each lift blade, respectively. The struts are connected with the shaft through shaft sleeves 8 and keys 9, so that the twisted lift blades, the struts and the shaft rotate synchronously.

Further, for the abovementioned hydropower device combining lift and drag effects, wherein the cross section of the twisted lift blades has the profile of NACA0018 airfoil. The twist angle is 60°~66°.

Further, for the abovementioned hydropower device combining lift and drag effects, wherein the twist angle of all the lift blades is 65°.

Further, for the abovementioned hydropower device combining lift and drag effects, wherein both the first-stage drag-type runner and the second-stage drag-type runner comprise two twisted drag blades attached to the shaft.

Further, for the abovementioned hydropower device combining lift and drag effects, wherein the first-stage drag-type runner and the second-stage drag-type runner are staggered in circumferential direction, and the staggering angle is 90°.

Further, for the abovementioned hydropower device combining lift and drag effects, wherein the twist angle of all the drag blades is 80°~100°.

Further, for the abovementioned hydropower device combining lift and drag effects, wherein the twist angle of all the drag blades is 90°.

Further, for the abovementioned hydropower device combining lift and drag effects, wherein the shaft is horizontally installed.

The present invention has significant advantages and beneficial effects over current technology, as embodied in the following aspects:

① The hydro power device of the present invention is uniquely designed, adopting the structure combining a disc generator, a lift-type runner and two drag-type runners configured in series. The hydro power device can effectively convert the kinetic energy of flowing water into the mechanical energy and then electricity, and has high hydropower generation efficiency, self-startup performance and operating stability;

② The twisted lift blade is characterized by high efficiency of energy conversion, and the drag blades of the two drag-type runners produce large torque. The hydro power device of the present invention has the advantages of the two types of runners. The kinetic energy of incoming water is fully harnessed by three runners and converted into the power to drive the rotation of the shaft. Therefore, the operating efficiency of the hydro power device is high;

③ The lift blades are twisted, and the drag blades are twisted as well. Therefore, the hydro power device can adapt to water incoming from any direction. The runners can rotate regardless of the direction of the water flow, which enhances the startup performance of the whole hydropower device. There is no blind zone of self-startup since all runners can start up;

④ With the rotation of the three runners, the wake flow immediately downstream of the runners exhibits an overall spiral pattern with its axis in horizontal direction. The spiral wake travels in downstream direction. Since there is some vertical distance between the runners and the downstream seabed or riverbed, the wake will not produce shear and excavation effects on the seabed or riverbed. Alternatively, the disturbance to surrounding environment and the downstream seabed or riverbed is insignificant;

⑤ The energy conversion efficiency, self-startup performance, and operating stability have been comprehensively taken into account and guaranteed, and there is no adverse impact on downstream seabed or riverbed and surrounding environment, making the hydropower device suitable for wide and clustering application.

Other features and advantages of the present invention will be set forth in the ensuing specification and, in part, will become apparent from the specification or will be understood by carrying out specific embodiments of the invention. The objects and other advantages of the present invention may be achieved and obtained by means of the structure particularly indicated in the specification as written and in the accompanying drawings.

BRIEF DESCRIPTION OF DRAWINGS

In order to more clearly illustrate the technical solutions of the embodiments of the present invention, the accompanying drawings to be used in the embodiments will be briefly introduced below, and it should be understood that the following accompanying drawings only show certain embodiments of the present invention, and therefore should not be regarded as a limitation of the scope, and that, for a person of ordinary skill in the field, other relevant accompanying drawings can be obtained on the basis of these drawings, without creative labour.

DESCRIPTION OF EMBODIMENTS

The technical solutions in the embodiments of the present invention will be clearly and completely described below in conjunction with the accompanying drawings in the embodiments of the present invention, and it will be apparent that the embodiments described are only a portion of the embodiments of the present invention and not all of the embodiments. The components of embodiments of the present invention generally described and illustrated in the accompanying drawings herein may be arranged and designed in a variety of different configurations. Accordingly, the following detailed description of embodiments of the present invention provided in the accompanying drawings is not intended to limit the scope of the invention for which protection is claimed, but rather represents only selected embodiments of the invention. Based on the embodiments of the present invention, all other embodiments obtained by a person skilled in the art without creative labour are within the scope of protection of the present invention.

It should be noted that: similar labels and letters denote similar items in the following accompanying drawings, so that once an item has been defined in one accompanying drawing, it does not need to be further defined and explained in subsequent accompanying drawings. Also, in the description of the present invention, orientation terms, order terms, etc., are used only to differentiate the description and are not to be understood as indicating or implying relative importance.

Figure 1:
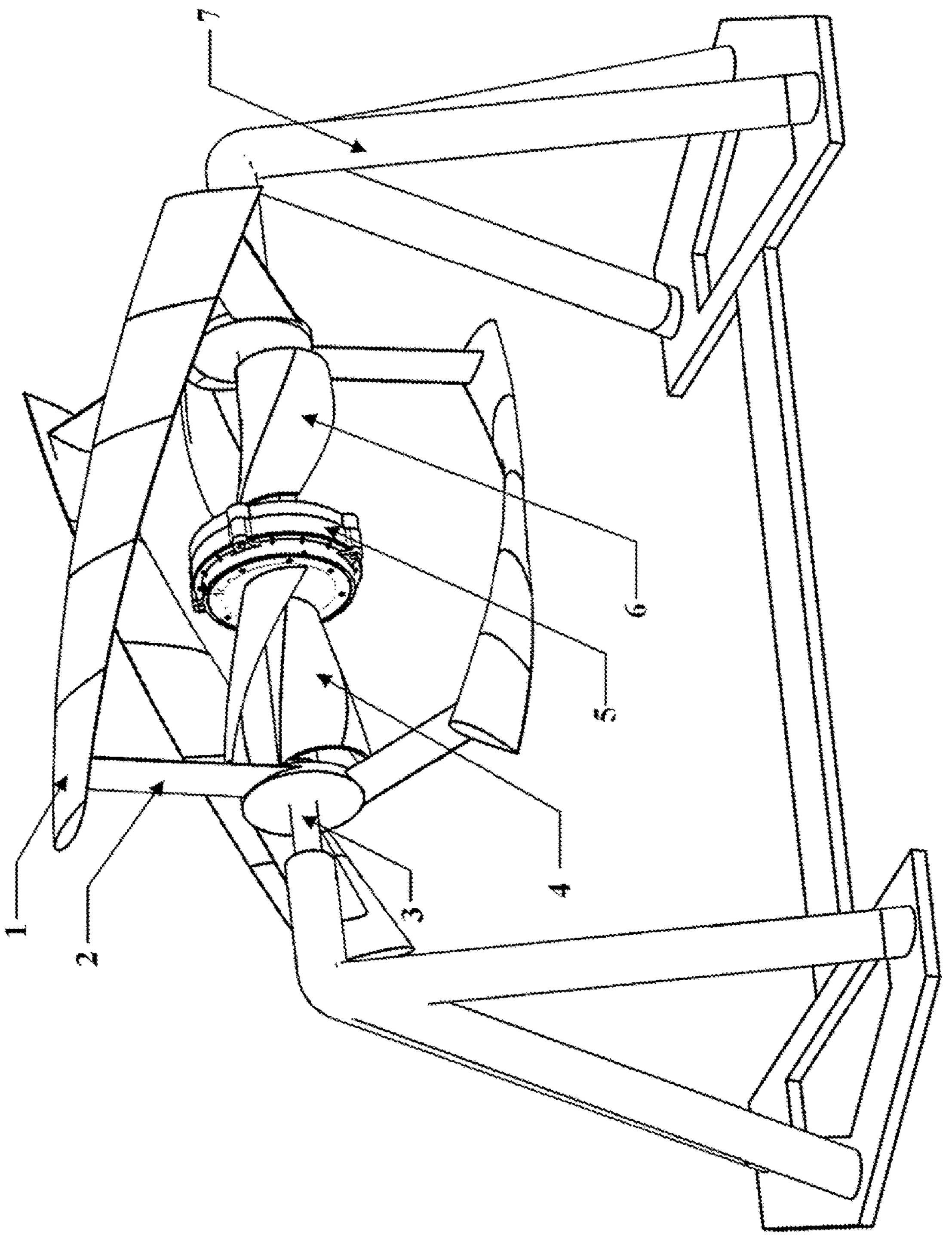
FIG. 1: a schematic diagram of the structure of the device of the present invention.
Figure 2:
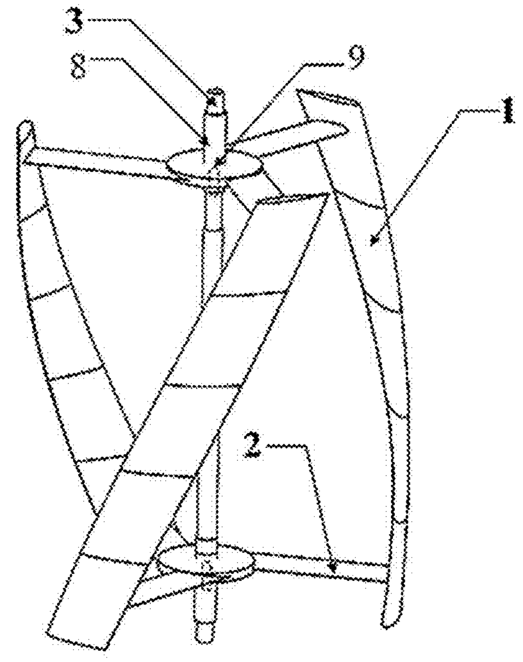
FIG. 2: a schematic diagram of the structure of the lift-type runner.
Figure 3:
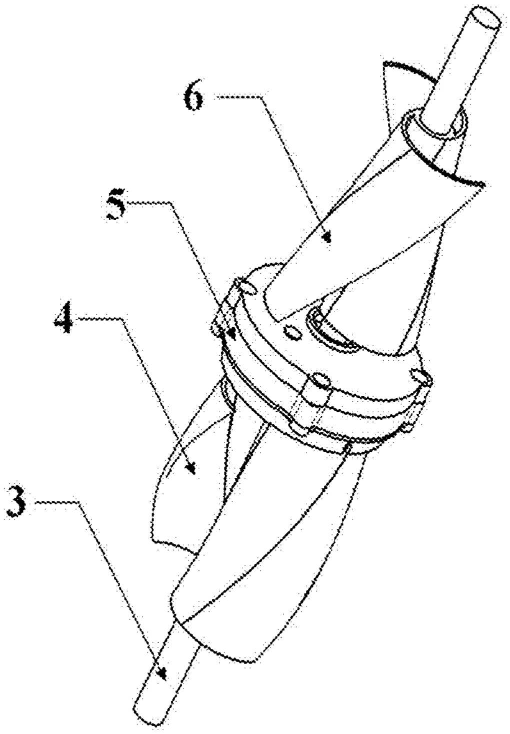
FIG. 3: a schematic diagram of the structure of the first-stage drag-type runner and the second-stage drag-type runner.

As shown in FIG. 1~FIG. 3, the hydropower device combining lift and drag effects comprises a shaft-3, a lift-type runner, a first-stage drag-type runner, and a second-stage drag-type runner. The three runners are coaxially installed on shaft 3. Shaft 3 is horizontally and rotatably installed on the support frame 7. The first-stage drag-type runner and the second-stage drag-type runner are installed in series on shaft 3. Disc generator 5 is located between the first-stage drag-type runner and the second-stage drag-type runner and is connected with shaft 3. The first-stage drag-type runner comprises two twisted drag blades 4, and the second-stage drag-type runner comprises two twisted drag blades 6, both attached to shaft 3. Drag blades 4 of the first-stage drag-type runner and drag blades 6 of the second-stage drag-type runner are staggered in circumferential direction with a staggering angle of 90°. The twist angle of the drag blades 4 of the first-stage drag-type runner and the drag blades 6 of the second-stage drag-type runner is 80°~100°, preferably 90°.

Lift blades encircle the first-stage drag-type runner, the second-stage drag-type runner and disc generator 5 and are attached to shaft 3. The lift-type runner comprises three twisted lift blades 1, which are evenly distributed in circumferential direction. Struts 2 are installed at both ends of each twisted lift blade 1, and struts 2 are connected with shaft 3 through shaft sleeves 8 and keys 9 to synchronize rotation of the twisted lift blades 1, struts 2, and shaft 3. The cross section of the has a profile of NACA0018 airfoil, and the twist angle twisted lifts blades 1 is 60°~66°, preferably 65°; The cross section of struts 2 has a profile of NACA0018 airfoil as well.

Therefore, a structure with an outer lift-type runner and two inner drag-type runners in series configuration is established.

Figure 4:
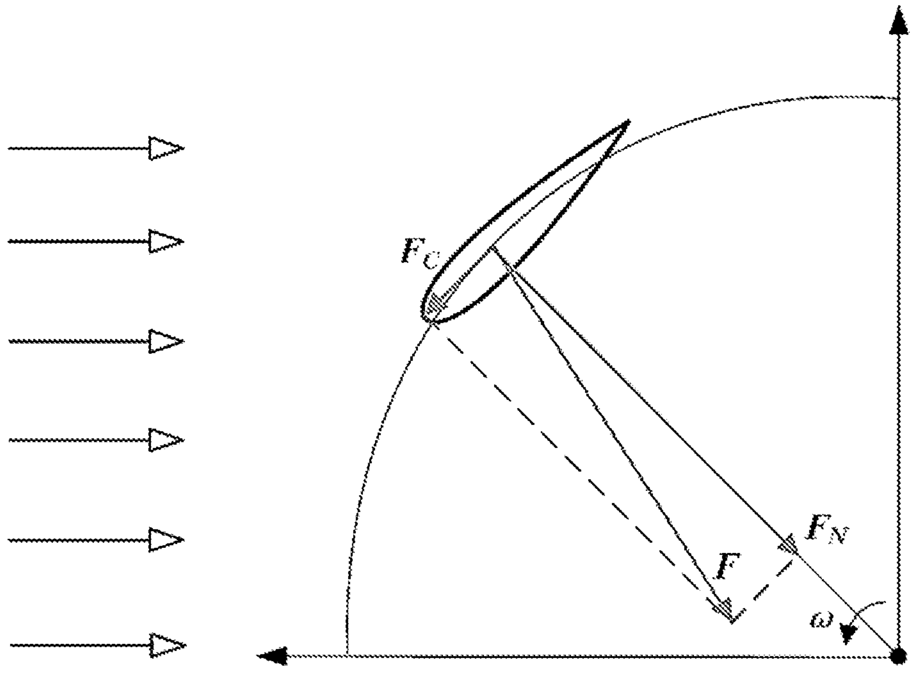
FIG. 4: a schematic diagram of the forces acting on a single lift blade.

The forces acting on a cross-section of a single lift blade are used to illustrate their contribution to the rotation of the shaft, as schematically shown in FIG. 4. The direction of the incoming flow is from the left to the right. The resultant force F is obtained when the cross section of the blade undergoes the action of flowing water flow. The resultant force F can be decomposed into the force FN pointing towards the axis of the shaft and the force Fc along a tangent to the circumference. FN does not contribute to the rotation of the lift blade, and Fc produces a torque to drive the lift blade to rotate.

Figure 5:
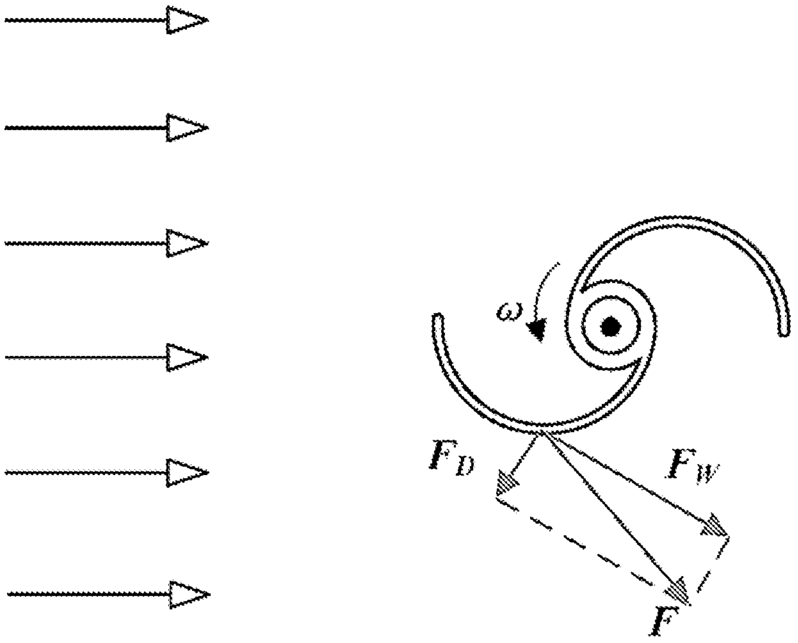
FIG. 5: a schematic diagram of the forces acting on a single drag blade.

The forces acting on a cross-section of a single drag blade are used to illustrate their contribution to the rotation of the shaft, as schematically shown in FIG. 5. The direction of the incoming flow is from the left to the right. The resultant force F is obtained when the cross section of the blade undergoes the action of flowing water flow. The resultant force F can be decomposed into a force directing toward the axis of the shaft, $F_D$, and a force component, $F_W$, perpendicular to $F_D$. $F_D$ does not contribute to the rotation of the drag blade, and $F_W$ produces a torque that drives the drag blade to rotate.

Under the impact of flowing water, the lift-type runner and the two drag-type runners rotate. Shaft 3 is installed horizontally. When incoming water acts on twisted lift blades 1 located in the periphery, a hydraulic torque that drives shaft 3 to rotate is generated due to contribution of the lift force. When incoming water acts on drag blades 4 of the first-stage drag-type runner and drag blades 6 of the second-stage drag-type runner, located at the inner part, the force resulting from the pressure difference over the two sides of each drag blade promotes the rotation of the drag blade. Therefore, a hydraulic torque that drives shaft 3 to rotate is generated. Shaft 3 is rigidly connected with the rotor of disc generator 5, so the rotor of disc generator 5 rotates, generating current through electromagnetic coupling between the rotor and the stator of disc generator 5.

When interacting with flowing water, twisted lift blades 1 exhibit a high efficiency of energy conversion, and drag blades 4 of the first-stage drag-type runner and drag blades 6 of the second-stage drag-type runner produce large torque. The hydropower device in present invention combines the advantages of the two types of runners. After water passes through twisted lift blades 1 and drag blades 4 of the first-stage drag-type runner and drag blades 6 of the second-stage drag-type runner, the kinetic energy of water has been sufficiently converted into the mechanical energy that drives the rotation of shaft 3 by the three runners. Therefore, the operating efficiency has been significantly improved with the present invention.

Since the lift blades and drag blades have twisted geometry, they can adapt to the incoming water from any direction. Alternatively, the three runners can rotate regardless of the direction of the water flow, which enhances the startup performance of the whole hydropower device, and there is no blind zone of self-startup because all the three runners can startup.

The shaft is installed horizontally, and the supporting is set at the two ends of the shaft. The disc generator is installed in the middle of the first-stage drag-type runner and the second-stage drag-type runner, so the tilting moment generated by flowing water on the entire rotating body is undergone by the supporting frame, which will not cause the bending of the shaft. Therefore, the operating stability of the hydropower device in the present invention is high.

The wake flow immediately downstream of the three runners exhibits a spiral pattern with a horizontal center line. The wake flow continues to migrate downstream. Since there is a certain vertical distance between the runners and downstream seabed or riverbed, the wake flow will not impose shear and excavation effects on the seabed or riverbed, alleviating the scouring of the downstream seabed or riverbed.

Upstream water flows toward the hydropower device of the present invention in a direction perpendicular to the axis of the shaft, and not only the lift blades produce the hydraulic torque that drives the rotation of the shaft under the action of the lift force, but also the drag blades will rotate since they are connected to the shaft, fully converting the kinetic energy of incoming water into the mechanical energy.

When water flows toward the hydropower device of the present invention in a direction parallel with the axis of the shaft, since the drag blades of the two drag-type runners have twisted geometry, as long as water enters the space surrounded by the twisted blades, the hydraulic force will drive the rotation of the twisted drag blades, thus the shaft, the lift blades and the rotor of the generator will rotate synchronously.

In summary, a novel design is implemented in the hydroelectric power generation device presented. The structure combining a lift-type runner and two drag-type runners in series configuration is adopted, effectively converting the kinetic energy of flowing water into the mechanical energy that drives the rotation of the rotor of the generator. High power generation efficiency, good self-startup performance, and stable operation are accomplished. These ensure high energy conversion efficiency, startup performance and operating stability of the whole hydroelectric power generation device. Furthermore, no adverse impact on downstream seabed or riverbed and the underwater environment is incurred with the operation of the hydroelectric power generation device presented, which is therefore suitable for popularization and applications individually or in clusters.

The foregoing is only a preferred embodiment of the present invention, and is not intended to limit the present invention, which may be subject to various changes and variations for those skilled in the art. Any modifications, equivalent substitutions, improvements, etc. made within the spirit and principles of the present invention shall be included in the scope of protection of the present invention. It should be noted that similar symbols and letters denote similar items in the following accompanying drawings, and therefore, once an item is defined in an accompanying drawing, it does not need to be further defined and explained in subsequent accompanying drawings.

The foregoing is only a specific embodiment of the present invention, but the scope of protection of the present invention is not limited thereto, and any person skilled in the art who is familiar with the technical field of the present invention can readily think of variations or substitutions within the technical scope of the present invention as disclosed herein, all of which shall be covered within the scope of protection of the present invention.

It is to be noted that, in this document, relational terms such as first and second are used only to distinguish one entity or operation from another, and do not necessarily require or imply the existence of any such actual relationship or order between those entities or operations. Further, the terms "including", "comprising", or any other variant thereof, are intended to cover non-exclusive inclusion, such that a process, method, article, or apparatus comprising a set of elements includes not only those elements, but also other elements not expressly listed, or other elements that are not expressly listed for the purpose of such a process, method, article or apparatus, elements, or also includes elements that are inherent to such process, method, article or apparatus. Without further limitation, the fact that an element is defined by the phrase "includes a . . . " does not preclude the existence of additional identical elements in the process, method, article or apparatus that includes said element.

What is claimed is:

1. A hydropower device combining lift and drag effects, characterized in that: comprises a shaft, and a lift-type runner, a first-stage drag-type runner, and a second-stage drag-type runner coaxially installed on the shaft, wherein the shaft is horizontally oriented and rotatably installed on a support frame, the first-stage drag-type runner and the second-stage drag-type runner are installed in series on the shaft, a disc generator installed on the shaft is positioned between the first-stage drag-type runner and the second-stage drag-type runner, the lift-type runner encircling the first-stage drag-type runner and the second-stage drag-type runner is installed on the shaft to form a combinative structure of one-stage lift-type runner disposed outer while two-stage drag-type runners disposed inner; under an action of flowing water, the lift-type runner generates a torque to rotate the shaft through a lift of a plurality of blades of the lift-type runner, the first-stage drag-type runner and the second-stage drag-type runner generate a torque to rotate the shaft through a drag of a plurality of blades of the first-stage drag-type runner and the second-stage drag-type runner, the hydrokinetic energy is converted into a mechanical energy to rotate a rotor of the disc generator, wherein the lift-type runner comprises three twisted lift blades connected to the shaft through struts, the struts are deployed at two ends of each of the twisted lift blades, the struts are connected with the shaft through shaft sleeves and keys, synchronizing the rotation of the twisted lift blades, the struts, and the shaft, an airfoil of the twisted lift blade is NACA0018 airfoil, and a twist angle of the twisted lift blades is 60°~66°, wherein both of the first-stage drag-type runner and the second-stage drag-type runner comprise two twisted drag blades connected to the shaft, the first-stage drag-type runner and the second-stage drag-type runner are staggered in a circumferential direction with a circumferential staggering angle of 90°, a twist angle of the twisted drag blades is 80°~100°.

2. The hydropower device combining lift and drag effects according to claim 1, characterized in that: the twist angle of the twisted lift blades is 65°.

3. The hydropower device combining lift and drag effects according to claim 1, characterized in that: the twist angle of the twisted drag blades is 90°.

* * * * *